United States Patent [19]
Manalo

[11] Patent Number: 5,292,276
[45] Date of Patent: Mar. 8, 1994

[54] EARLY CHILDHOOD LEARNING TOY

[76] Inventor: Teresita D. Manalo, 76 Wiley Avenue, Toronto, Ontario, Canada, M4J 3W6

[21] Appl. No.: 100,254

[22] Filed: Aug. 2, 1993

[51] Int. Cl.$^5$ ............ A63H 5/00; A63H 33/00; G09B 19/00
[52] U.S. Cl. .................... 446/418; 446/227; 446/491; 434/258
[58] Field of Search ............ 446/227, 418, 901, 491, 446/419; 434/258, 259, 260

[56] References Cited

U.S. PATENT DOCUMENTS

| | | | |
|---|---|---|---|
| 3,648,403 | 3/1972 | Gommel | 446/491 |
| 3,955,314 | 5/1976 | Robb | 446/491 X |
| 4,594,072 | 6/1986 | Cowell | 446/227 |
| 4,661,072 | 4/1987 | White | 434/260 |
| 4,790,790 | 12/1988 | Todokoro | 446/418 X |

Primary Examiner—Mickey Yu
Attorney, Agent, or Firm—S. Michael Bender

[57] ABSTRACT

A new and improved early childhood learning toy includes a housing portion which includes planar walls, wherein at least two of the planar walls include different colors, and wherein at least two of the planar walls includes different visible patterns. The planar walls define an interior chamber. One of the planar walls includes one aperture permitting communication between the interior chamber and outside the housing portion. One of the planar walls includes two apertures permitting communication between the interior chamber and outside the housing portion. A plurality of cords includes respective ends attached to opposite ends of a planar wall. The cords extend across the planar wall, and a plurality of solid geometrical shapes are supported by the cords such that the geometrical shapes can be selectively moved along the cords. The respective geometrical shapes include respective centrally located cord-receiving apertures for receiving the cords. The cords are made of elastic material. A tether is connected to a planar wall, and a ball is connected to the tether. The tether and the ball are made from elastic material. A stick holder assembly is attached to a planar wall, and a pair of drumsticks are capable of being retained in the stick holder assembly. An array of chimes may be attached to a planar wall. A quantity of a hook or loop material may be attached to a planar wall.

9 Claims, 4 Drawing Sheets

EARLY CHILDHOOD LEARNING TOY

BACKGROUND OF THE INVENTION

1. Field of the Invention

The present invention relates generally to toys for young children, and, more particularly, to toys especially designed to stimulate the senses and learning of young children.

2. Description of the Prior Art

Toys especially designed to stimulate the senses and learning in children ranging in ape from approximately four to eighteen months are often referred to as cognitive toys. Often such cognitive toys are designed to emphasize one form of stimulation. For example, one toy may emphasize visual stimulation and learning. Another toy may emphasize audible stimulation and learning. Still another may emphasize tactile stimulation and learning. In this respect, it would be desirable if an early childhood learning device were provided which includes features that stimulate learning with visual, audible, and tactile forms of stimulation.

A single toy that emphasizes one type of learning stimulation may produce its desired results only for a short period of time. This is because the attention span of very young children is quite short. However, if an early childhood learning toy apparatus included a variety of forms of stimulation, once the child tires of one form of stimulation, the child could readily turn its attention to another feature of the apparatus. In this respect, it would be desirable if an early childhood learning device were provided with a variety of forms of sensory and mental stimulation so that when the child tired of one feature of the apparatus. the child could readily redirect attention to another feature of the apparatus.

Throughout the years, a number of innovations have been developed relating to toys promoting early childhood development, and the following U.S. patens are representative of some of those innovations: U.S. Pat. Nos. 3,564,759; 4,188,745; 4,334,382; 4,968,279; and 5,067,925. More specifically, U.S. Pat. No. 3,564,759 discloses a toy in the form of a mobile in which objects are suspended from strings. For using this mobile in a practical way, an infant would normally be lying down in a crib. In this respect, it would be desirable if an early childhood learning device were provided which were usable for a child who is standing or walking.

U.S. Pat. No. 4,188,745 discloses an infant toy that includes a number of objects suspended on spring-like supports. The objects provide visual interest to a young child in an infant seat, or other device for child seating. In this respect, it would be desirable if an early childhood learning device were provided which were usable for a child who is not sedentary, but who is mobile and can move around the device.

U.S. Pat. No. 4,334,382 discloses an infant development ring toy which has portions which can be bitten by the child and has portions which give off an audible sound. The toy is small and can be held in the child's hands.

In the process of child development, the child must learn to live in an environment that is much larger than the child himself. In this respect, it would be desirable if an early childhood learning device were provided which were bigger than the child himself so as to aid the child in developing skills relating to the child interacting with the larger environment.

U.S. Pat. No. 4,968,279 discloses another infant toy which is used by an infant lying down in a crib and provides visual and touch stimulation.

U.S. Pat. No. 5,067,925 discloses an infant's toy that is both visually and audibly attractive. The device is generally planar in shape. Because this device is generally planar in shape, it does not provide a young child with experience in a clearly three dimensional environment. In this respect, it would be desirable if an early childhood learning device were provided which provides a young child with experiences and stimulations in a substantially three dimensional environment.

Still other features would be desirable in an early childhood learning toy. To stimulate the child's visual senses, it would be desirable if an early childhood learning device were provided having a variety of colors and visual patterns. A skill that is conducive to motor development and hand-eye coordination is placing objects in and removing object from a box. In this respect, it would be desirable if an early childhood learning device were provided which has a box into which and out of which objects are placed and removed by the child.

With the mobile devices mentioned above, the child can see random motion of objects that the child hits. However, to permit the child to learn that he can exercise considerable control over his environment, it would be desirable if an early childhood learning device were provided which permitted the child to exercise accurate control over objects that the child contacts.

A container is usually for containing objects therein. However, a container can serve other purposes. It can be visually stimulating by having designs on the outside of the container. Moreover, the container has walls which may be struck to make audible sounds. To permit the child to gain experience in viewing an object, such as a container, in a variety of aspects, the container could be provided with accessory striking objects, such as drum sticks, so that child can appreciate different aspects, such as audible aspects, of a container device.

A ball is always a fascinating toy to a child. Yet, because a ball rolls, it often rolls out of reach of a child. Moreover, if the child chases after a ball that rolls into an unsafe or dangerous location, such as down a flight of stairs, the child may be in great danger if the child follows an errant ball. In this respect, it would be desirable if an early childhood learning device were provided which included a ball that was prevented from rolling away from the device.

Many toys for young children have sound producers which generate random sounds when the child strikes or moves the toy. It would be desirable, however, if the sounds generated by the child could be discrete and particular. This would give the child experience in directly controlling his audible environment. In this respect, it would be desirable if an early childhood learning device were provided which enabled the child to exercise direct control over audible objects to create discrete reproducible sounds.

Thus, while the foregoing body of prior art indicates it to be well known to use toys to stimulate early childhood development, the prior art described above does not teach or suggest an early childhood learning toy which has the following combination of desirable features: (1) includes features that stimulate learning with visual, audible, and tactile forms of stimulation; (2) provides a variety of forms of sensory and mental stimulation so that when the child tires of one feature of the apparatus, the child can readily redirect attention to another feature of the apparatus; (3) is usable for a child who is standing or walking; (4) is usable for a child who is not sedentary, but who is mobile and can move around the device; (5) is bigger than the child himself so as to aid the child in developing skills relating to the child interacting with the larger environment; (6) provides a young child with experiences and stimulations in a substantially three dimensional environment; (7) has a variety of colors and visual patterns; (8) has a box into which and out of which objects are placed and removed by the child; (9) permits the child to exercise accurate control over objects that the child contacts; (10) is provided with accessory striking objects, such as drum sticks, so the child can appreciate different aspects, such as audible aspects, of a container device; (11) includes a ball that is prevented from rolling away from the device; and (12) enables the child to exercise direct control over audible objects to create discrete reproducible sounds. The foregoing desired characteristics are provided by the unique early childhood learning toy of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved early childhood learning toy which includes a housing portion which includes planar walls, wherein at least two of the planar walls include different colors, and wherein at least two of the planar walls includes different visible patterns. The planar walls define an interior chamber. One of the planar walls includes one aperture permitting communication between the interior chamber and outside the housing portion. One of the planar walls includes two apertures permitting communication between the interior chamber and outside the housing portion.

A plurality of cords includes respective ends attached to opposite ends of a planar wall. The cords extend across the planar wall, and a plurality of solid geometrical shapes are supported by the cords such that the geometrical shapes can be selectively moved along the cords. The respective geometrical shapes include respective centrally located cord-receiving apertures for receiving the cords. The cords are made of elastic material.

A tether is connected to a planar wall, and a ball is connected to the tether. The tether is made from elastic material. The ball is also made from elastic material.

A stick holder assembly is attached to a planar wall, and a pair of drumsticks are capable of being retained in the stick holder assembly.

An array of chimes may be attached to a planar wall. The array of chimes is located between the planar wall and the geometrical shapes and cords which extend across the planar wall.

A quantity of a hook or loop material may be attached to a planar wall.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved early childhood learning toy which has all of the advantages of the prior art and none of the disadvantages.

It is another object of the present invention to provide a new and improved early childhood learning toy which may be easily and efficiently manufactured and marketed.

It is a further object of the present invention to provide a new and improved early childhood learning toy which is of durable and reliable construction.

An even further object of the present invention is to provide a new and improved early childhood learning toy which is susceptible of a low cost of manufacture with regard to both materials and labor, and which accordingly is then susceptible of low prices of sale to the consuming public, thereby making such early childhood learning toy available to the buying public.

Still yet a further object of the present invention is to provide a new and improved early childhood learning toy which includes features that stimulate learning with visual, audible, and tactile forms of stimulation.

Still another object of the present invention is to provide a new and improved early childhood learning toy that provides a variety of forms of sensory and mental stimulation so that when the child tires of one feature of the apparatus, the child can readily redirect attention to another feature of the apparatus.

Yet another object of the present invention is to provide a new and improved early childhood learning toy which is usable for a child who is crawling, sitting, standing or walking.

Even another object of the present invention is to provide a new and improved early childhood learning toy that is usable for a child who is not sedentary, but who is mobile and can move around the device.

It is still a further object of the present invention is to provide a new and improved early childhood learning toy which is bigger than the child himself so as to aid the child in developing skills relating to the child interacting with the larger environment.

Yet a further object of the present invention is to provide a new and improved early childhood learning toy that provides a young child with experiences and stimulations in a substantially three dimensional environment.

Still another object of the present invention is to provide a new and improved early childhood learning toy which has a variety of colors and visual patterns.

Yet another object of the present invention is to provide a new and improved early childhood learning toy that has a box into which and out of which objects are placed and removed by the child.

Still a further object of the present invention is to provide a new and improved early childhood learning toy that permits the child to exercise accurate control over objects that the child contacts.

Yet an even further object of the present invention is to provide a new and improved early childhood learning toy which is provided with accessory striking objects, such as drum sticks, so the child can appreciate different aspects, such as audible aspects, of a container device.

A further object of the present invention is to provide a new and improved early childhood learning toy that includes a ball that is prevented from rolling away from the device.

Yet another object of the present invention is to provide a new and improved early childhood learning toy which enables the child to exercise direct control over audible objects to create discrete reproducible sounds.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved early childhood learning toy embodying the principles and concepts of the present invention will be described.

Figure 1:
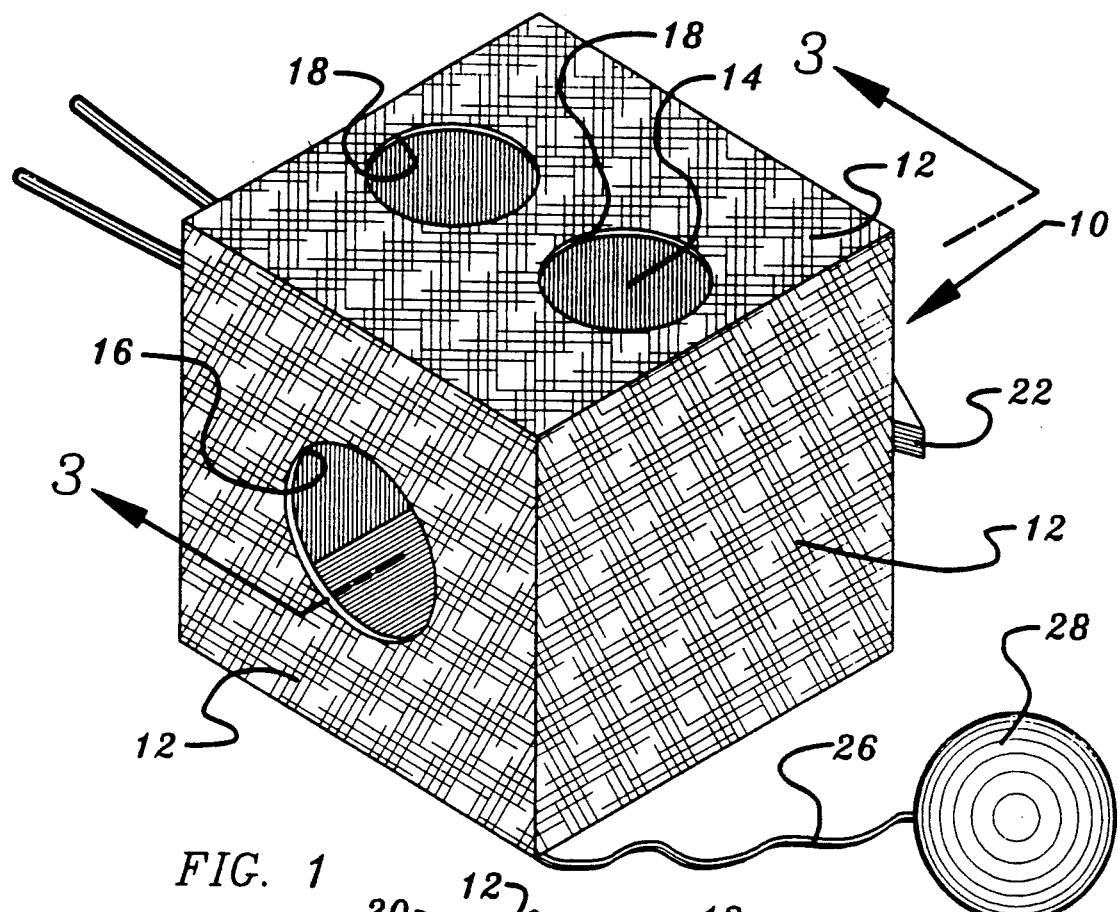
FIG. 1 is a top front perspective view showing a first preferred embodiment of the early childhood learning toy of the invention.
Figure 2:
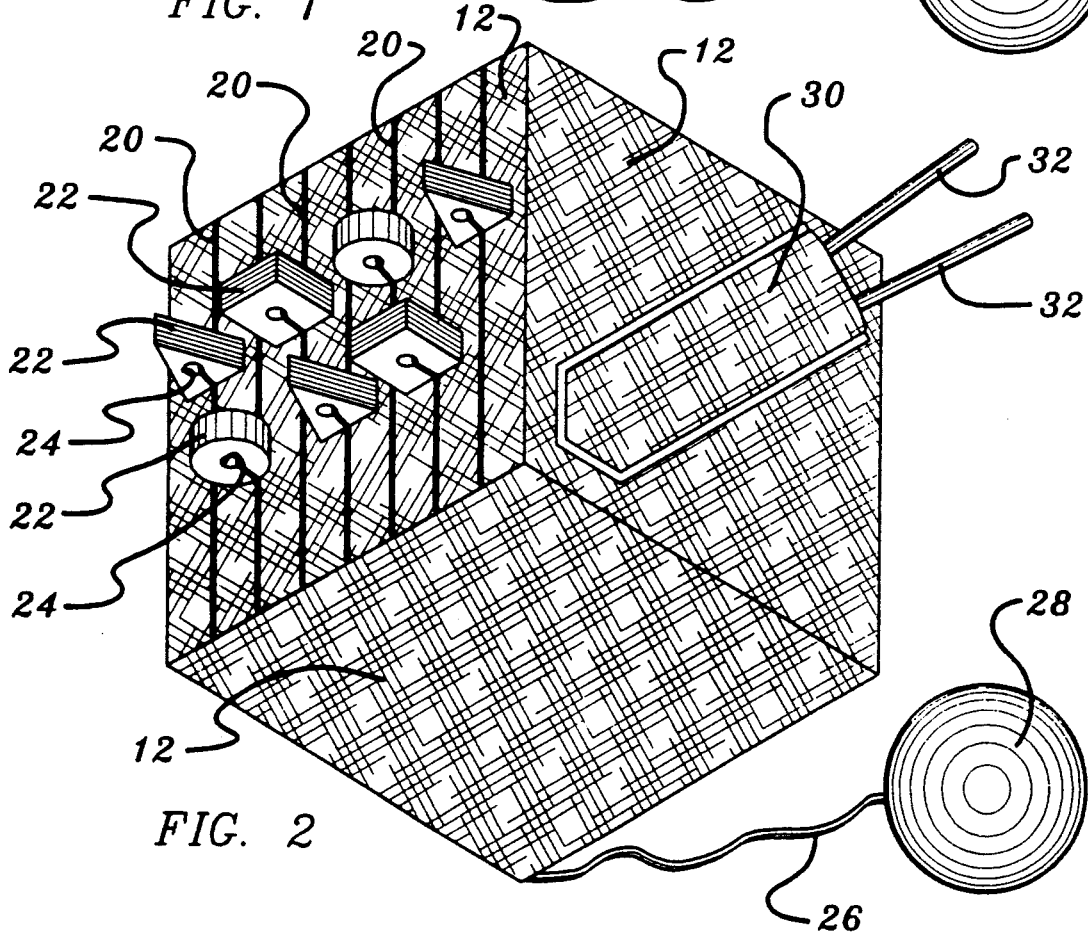
FIG. 2 is a bottom rear perspective view of the early childhood learning toy shown in FIG. 1.
Figure 3:
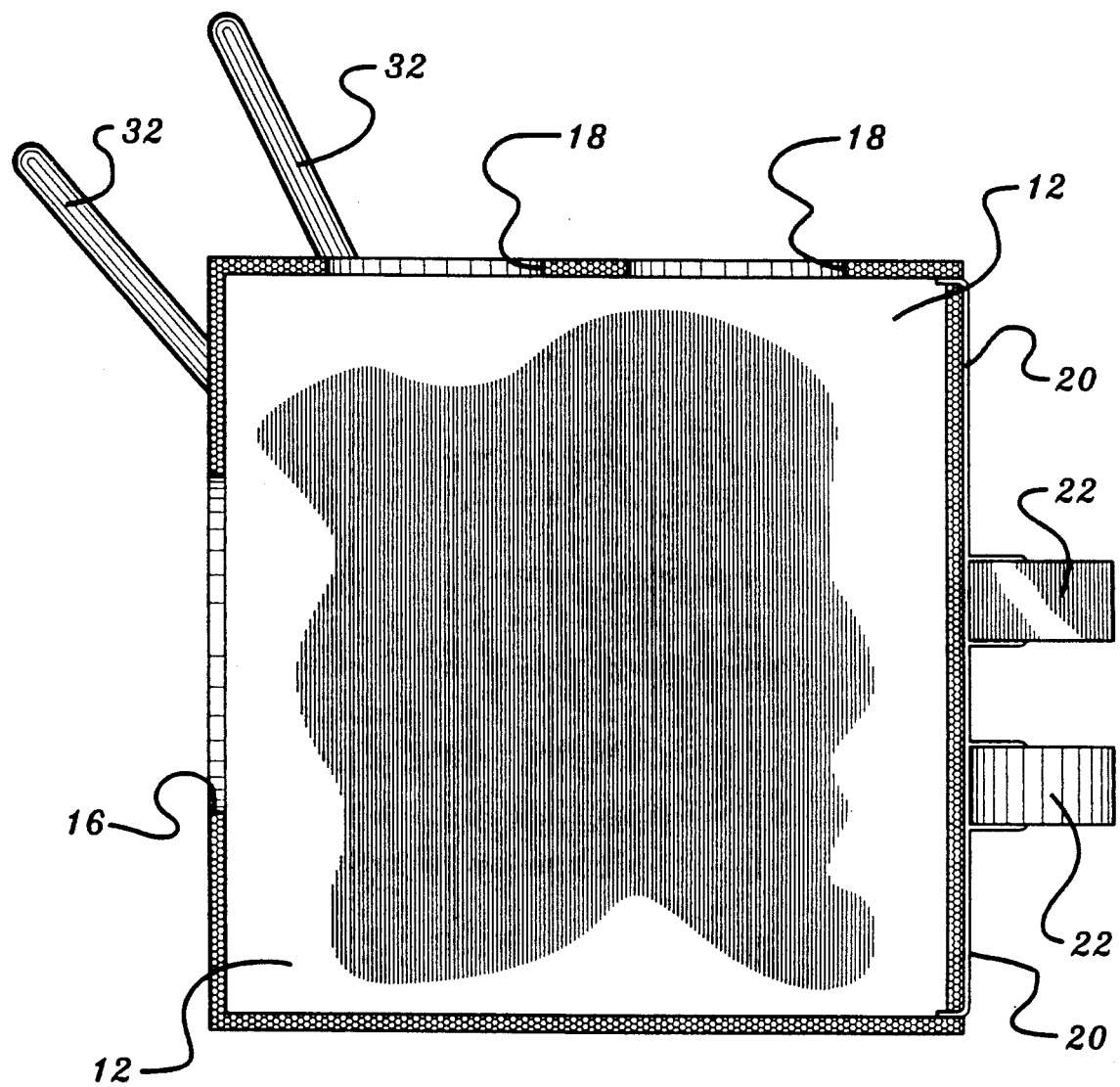
FIG. 3 is a side view of the early childhood learning toy of FIG. 2 taken along line 3—3 thereof.

Turning initially to FIGS. 1-3, there is shown a first exemplary embodiment of the early childhood learning toy of the invention generally designated by reference numeral 10. In its preferred form, early childhood learning toy 10 includes a housing portion, such as a box, which includes planar walls 12, wherein at least two of the planar walls 12 include different colors, and wherein at least two of the planar walls 12 include different visible patterns. The planar walls 12 define an interior chamber 14. One of the planar walls 12 includes one aperture 16 permitting communication between the interior chamber 14 and outside the housing portion. One of the planar walls 12 includes two apertures 18 permitting communication between the interior chamber 14 and outside the housing portion.

A plurality of cords 20 include respective ends attached to opposite ends of a planar wall 12. The cords 20 extend across the planar wall 12, and a plurality of solid geometrical shapes 22 are supported by the cords 20 such that the geometrical shapes 22 can be selectively moved along the cords 20. The respective geometrical shapes 22 include respective centrally located cord-receiving apertures 24 for receiving the cords 20. The cords 20 are made of elastic material.

A tether 26 is connected to a planar wall 12, and a ball 28 is connected to the tether 26. The tether 26 is made from elastic material. The ball 28 is also made from elastic material.

A stick holder assembly 30 is attached to a planar wall 12, and a pair of drumsticks 32 are capable of being retained in the stick holder assembly 30. The drumsticks 32 can be played with by the child and replaced into stick holder assembly 30 when finished with by the child.

Figure 4:
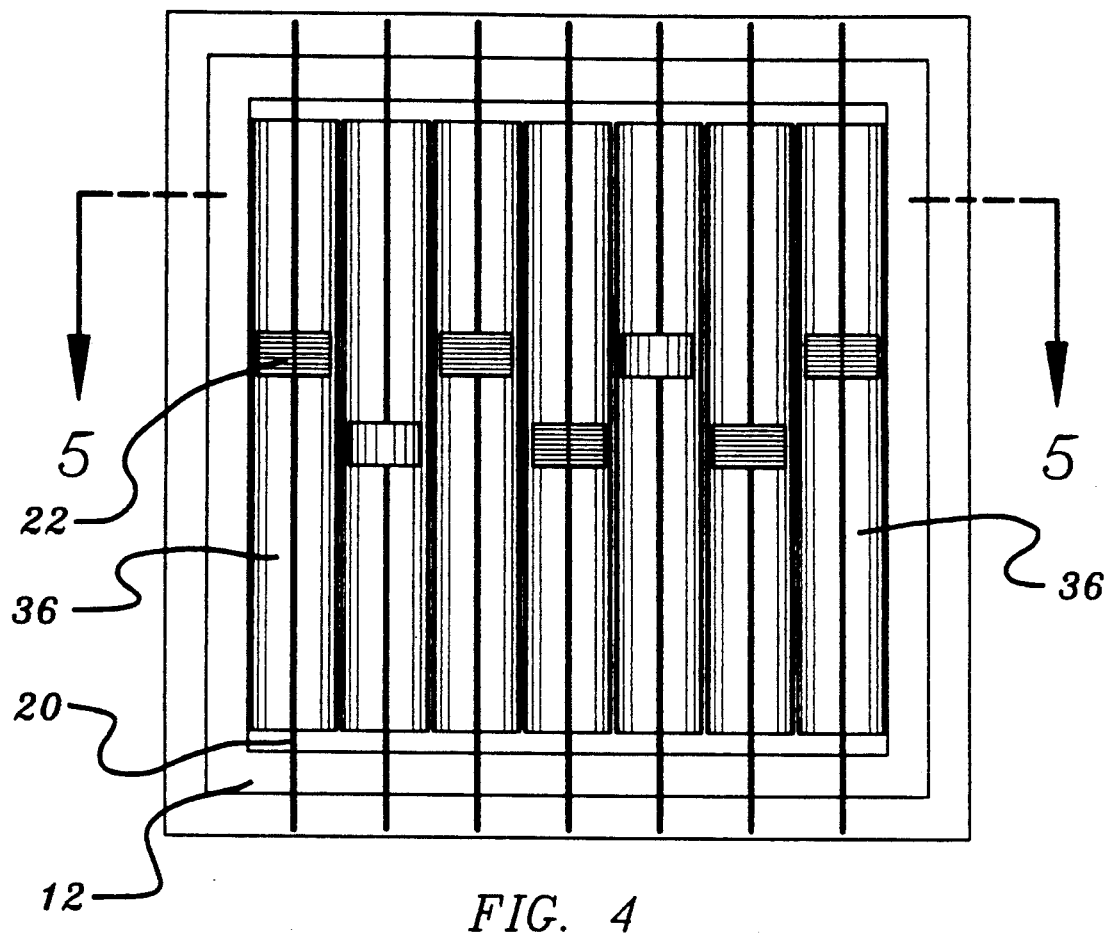
FIG. 4 is a side view of a second preferred embodiment of the invention showing an array of chimes.
Figure 5:
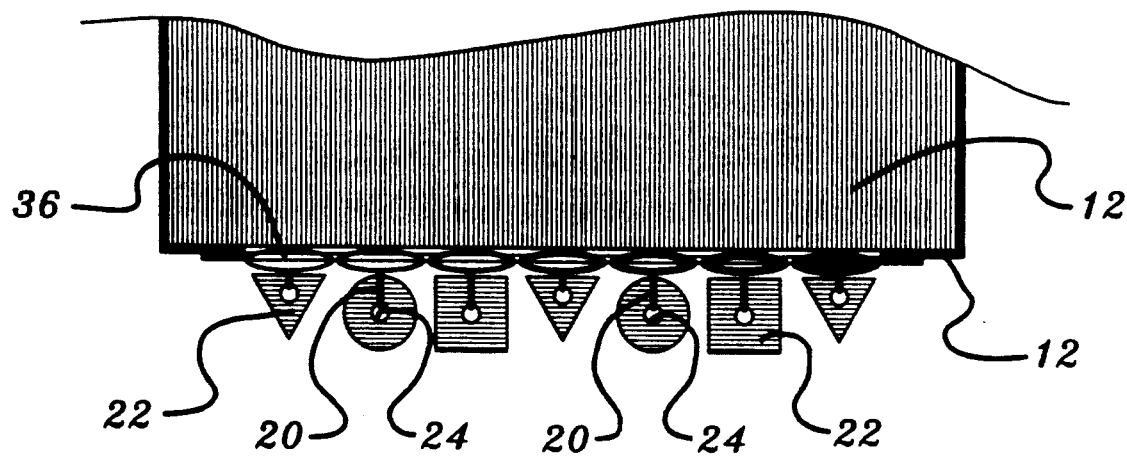
FIG. 5 is a partial top view of the embodiment of the invention shown in FIG. 4 taken along line 5—5 of FIG. 4.

Turning to FIGS. 4-5, a second embodiment of the invention is shown. Reference numerals are shown that correspond to like reference numerals that designate like elements shown in the other figures. In addition, an array of chimes 36 is attached to a planar wall 12. The array of chimes 36 is located between the planar wall 12 and the geometrical shapes 22 and cords 20 which extend across the planar wall 12.

Figure 6:
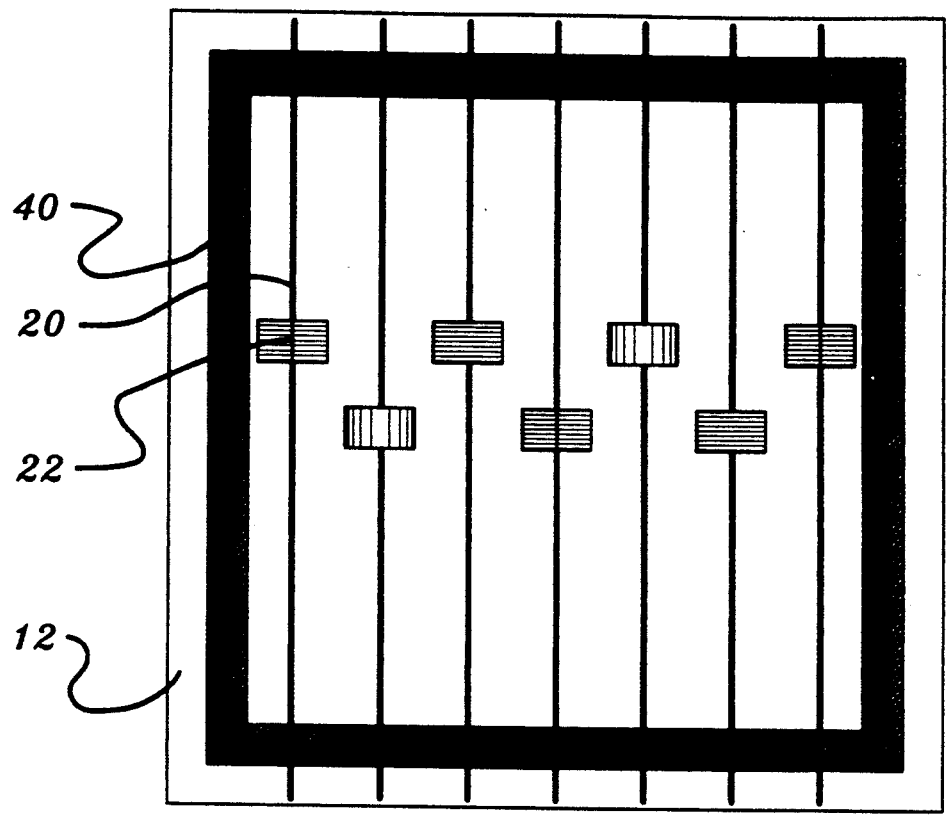
FIG. 6 is a side view of a third embodiment of the early childhood learning toy of the invention in which an array of elastic supported objects can be attached to a box with hook and loop connections.
Figure 7:
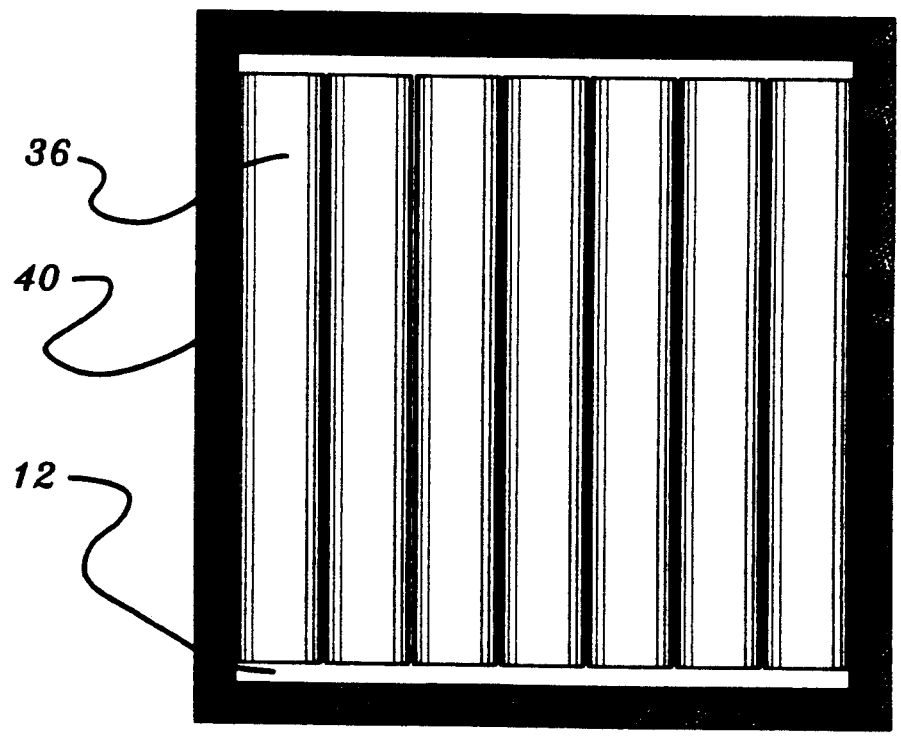
FIG. 7 is a side view of a fourth embodiment of the early childhood learning toy of the invention in which an array of chimes can be attached to a box with hook and loop connections.

Turning to FIGS. 6-7, a third embodiment of the invention is shown. Reference numerals are shown that correspond to like reference numerals that designate like elements shown in the other figures. In addition, a quantity of a hook or loop material 40 attached to a planar wall 12. The hook or loop material 40 can be made from VELCRO (TM). The hook or loop material has an interesting texture for the child to experience. In addition, the hook or loop material can be used by to receive objects or toys that include complementary loop or hook material. By attaching the objects or toys to the hook or loop material on a planar wall 12, the child gets more of the experience of the relationship between cause and effect.

In providing an early childhood learning toy in accordance with the invention, the housing can be made out of a paper box. The planar walls 12 may be covered by cloth or fabrics of different colors and textures. Different colors give the young child exercise of visual powers. Different colors give the young child exercise of both visual and tactile powers. The geometrical shapes 22 give practice in shape identification. Movement of the geometrical shapes 22 along the cords 20 give practice in hand-eye coordination. Pulling the geometrical shapes 22 on the cords 20 and releasing them over the chimes permits the chimes to be rung. This gives the child experiences in cause and effect in addition to providing exercise of hearing powers. The drumsticks can be used by the child to bang the planar walls 12 of the housing. The drumsticks are retained in the stick holder assembly 30. For the child to remove and replace the drumsticks from the stick holder assembly 30 not only requires manual dexterity, but it also gives the child practice in taking proper care of toys by putting them back in their proper place.

The apertures in the planar walls 12 permit communication between the interior and the exterior of the housing. A number of toys can be stored in the housing. In this respect, the early childhood learning toy of the invention serves an additional function, that of a toy box. The ball provides additional ways for the child to exercise motor skills. The tether on the ball prevents the ball from going too far from the box. Therefore, the child need not chase an errant ball and need not be exposed to potential dangers in chasing a ball that wanders too far from the box. In general, the early childhood learning toy of the invention provides one toy that provides exercise of the child's visual, audible, tactile, and motor skills and powers.

The components of the early childhood learning toy of the invention can be made from inexpensive and durable paper, fabric, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved early childhood learning toy that is low in cost, relatively simple in design and operation, and which may advantageously be used to stimulate learning with visual, audible, and tactile forms of stimulation. With the invention, an early childhood learning toy is provided which provides a variety of forms of sensory and mental stimulation so that when the child tires of one feature of the apparatus, the child can readily redirect attention to another feature of the apparatus. With the invention, an early childhood learning toy is provided which is usable for a child who is crawling, sitting, standing or walking. With the invention, an early childhood learning toy is provided which is usable for a child who is not sedentary, but who is mobile and can move around the device. With the invention, an early childhood learning toy is provided which is bigger than the child himself so as to aid the child in developing skills relating to the child interacting with the larger environment. With the invention, an early childhood learning toy is provided which provides a young child with experiences and stimulations in a substantially three dimensional environment. With the invention, an early childhood learning toy is provided which has a variety of colors and visual patterns. With the invention, an early childhood learning toy is provided which has a box into which and out of which objects are placed and removed by the child. With the invention, an early childhood learning toy is provided which permits the child to exercise accurate control over objects that the child contacts. With the invention, an early childhood learning toy is provided which is provided with accessory striking objects, such as drum sticks, so the child can appreciate different aspects; such as audible aspects, of a container device. With the invention, an early childhood learning toy is provided which includes a ball that is prevented from rolling away from the device. With the invention, an early childhood learning toy is provided which enables the child to exercise direct control over audible objects to create discrete reproducible sounds.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved early childhood learning toy, comprising: a housing portion which includes planar walls, wherein at least two of said planar walls include different colors, wherein at least two of said planar walls include different visible patterns, said planar walls defining an interior chamber, one of said planar walls including one aperture permitting communication between said interior chamber and outside said housing portion, one of said planar walls including two apertures permitting communication between said interior chamber and outside said housing portion, a plurality of cords including respective ends attached to opposite ends of a planar wall, said cords extending across the planar wall, and a plurality of solid geometrical shapes supported by said cords such that said geometrical shapes can be selectively moved along said cords.

2. The apparatus described in claim 1 wherein said respective geometrical shapes include respective centrally located cord-receiving apertures for receiving said cords.

3. The apparatus described in claim 1 wherein said cords are made of elastic material.

4. The apparatus described in claim 1, further including:

a tether connected to a planar wall, and a ball connected to said tether.

5. The apparatus described in claim 4 wherein said tether is made from elastic material.

6. The apparatus described in claim 4 wherein said ball is made from elastic material.

7. The apparatus described in claim 1, further including:
a stick holder assembly attached to a planar wall, and
a pair of drumsticks capable of being retained in said stick holder assembly.

8. The apparatus described in claim 1, further including:
an array of chimes attached to a planar wall and located between said planar wall and said geometrical shapes and said cords which extends across said planar wall.

9. The apparatus described in claim 1, further including:
a quantity of a hook or loop material attached to a planar wall.

* * * * *